(12) United States Patent
Verbrugh et al.

(10) Patent No.: US 10,383,198 B2
(45) Date of Patent: Aug. 13, 2019

(54) MAINTAINING A LIGHTING SYSTEM

(71) Applicant: SIGNIFY HOLDING B.V., Eindhoven (NL)

(72) Inventors: Stefan Marcus Verbrugh, Eindhoven (NL); Engel Johannes Knibbe, Eindhoven (NL); Johan Wilhelmus Hermanus Kuppen, Eindhoven (NL); Johannes Cornelis Augustus Franciscus Maria Van Gardigen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/747,094

(22) PCT Filed: Jul. 20, 2016

(86) PCT No.: PCT/EP2016/067294
§ 371 (c)(1),
(2) Date: Jan. 23, 2018

(87) PCT Pub. No.: WO2017/021149
PCT Pub. Date: Feb. 9, 2017

(65) Prior Publication Data
US 2018/0376570 A1 Dec. 27, 2018

(30) Foreign Application Priority Data
Aug. 4, 2015 (EP) .................................. 15179712

(51) Int. Cl.
*H04B 10/00* (2013.01)
*H05B 37/02* (2006.01)
(Continued)

(52) U.S. Cl.
CPC ....... *H05B 37/0272* (2013.01); *G01C 21/206* (2013.01); *H04B 10/116* (2013.01);
(Continued)

(58) Field of Classification Search
CPC .............. H04B 10/116; H04B 10/1143; H04B 10/1149; H04B 10/40; H04B 10/502;
(Continued)

(56) References Cited

U.S. PATENT DOCUMENTS 6,218,532 B1 * 4/2001 Mark .................... B29C 55/005
106/122
7,046,160 B2 * 5/2006 Pederson ............. B60Q 1/2611
340/815.45
(Continued)

FOREIGN PATENT DOCUMENTS

GB 2475713 A 6/2011
WO WO2009093158 A1 7/2009
(Continued)

*Primary Examiner* — Hibret A Woldekidan

(57) ABSTRACT

A lighting system comprises multiple luminaries (4b) installed at known locations in an environment. Each is configured to emit a unique luminaire identifier (ID) into the environment. A database (28) holds multiple location identifiers, each of which identifies one of the known locations. A route (rA, rB, rC, rD) through the environment is identified based on the location identifiers, the route traversing a plurality of the known locations. Data generated by moving a photodetector (6) along the route though the environment is received, the data conveying a sequence of the luminaire identifiers detected by the photodetector from luminaries encountered in moving along the route, the sequence being in order of detection. A database update is performed by, for at least one luminaire identifier in the sequence: identifying
(Continued)

its position in the sequence, and updating the database based on the at least one luminaire identifier and its identified position in the sequence.

15 Claims, 2 Drawing Sheets

(51) Int. Cl.
| | | |
|---|---|---|
| *G01C 21/20* | (2006.01) | |
| *H04B 10/116* | (2013.01) | |
| *G01C 21/16* | (2006.01) | |
| *H04W 4/02* | (2018.01) | |

(52) U.S. Cl.
CPC ..... H05B 37/0218 (2013.01); H05B 37/0245 (2013.01); *G01C 21/16* (2013.01); *H04W 4/023* (2013.01)

(58) Field of Classification Search
CPC ...... H04B 10/00; H04B 10/11; H04B 10/524; H04B 10/114; H04B 10/25752; H04B 10/50; H04B 10/1123; H04B 10/503; H05B 37/0272; H05B 37/0218; H05B 37/0245; G01C 21/16; G01C 21/206; G01S 19/48; G01S 5/0252; G01S 5/0263; G01S 1/70; G01S 5/16; H04K 3/90; H04W 4/023
USPC .......................... 398/118, 130, 127, 128, 172
See application file for complete search history.

(56) References Cited

U.S. PATENT DOCUMENTS

| | | | | |
|---|---|---|---|---|
| 8,188,878 | B2 * | 5/2012 | Pederson | G07C 9/00158 340/815.45 |
| 8,457,502 | B2 * | 6/2013 | Ryan | G01S 1/70 398/172 |
| 8,902,076 | B2 * | 12/2014 | Pederson | G07C 9/00158 340/815.45 |
| 8,964,016 | B2 * | 2/2015 | Ganick | G01S 1/70 348/61 |
| 9,218,532 | B2 * | 12/2015 | Roberts | G06K 9/00691 |
| 9,423,349 | B2 * | 8/2016 | Tanabe | G01N 21/6452 |
| 9,691,285 | B2 * | 6/2017 | Jarrell | G08G 5/0069 |
| 2008/0265799 | A1 * | 10/2008 | Sibert | H05B 37/0245 315/292 |
| 2012/0200226 | A1 * | 8/2012 | Knibbe | H04B 10/1149 315/151 |
| 2014/0064739 | A1 * | 3/2014 | Chen | H04B 10/1143 398/130 |
| 2014/0093126 | A1 | 4/2014 | Roberts | |
| 2014/0265870 | A1 * | 9/2014 | Walma | H05B 37/0218 315/151 |
| 2015/0003836 | A1 * | 1/2015 | Yamasaki | H04B 10/116 398/118 |
| 2017/0099718 | A1 * | 4/2017 | Stout | H05B 37/0272 |
| 2017/0339000 | A1 * | 11/2017 | Wennemyr | G06F 9/223 |
| 2018/0048390 | A1 * | 2/2018 | Palmer | H04B 10/116 |
| 2018/0293593 | A1 * | 10/2018 | De Bruijn | G01C 21/206 |
| 2018/0346299 | A1 * | 12/2018 | High | E01H 5/12 |

FOREIGN PATENT DOCUMENTS

| | | |
|---|---|---|
| WO | WO2015036884 A2 | 3/2015 |
| WO | WO2015036912 A1 | 3/2015 |

* cited by examiner

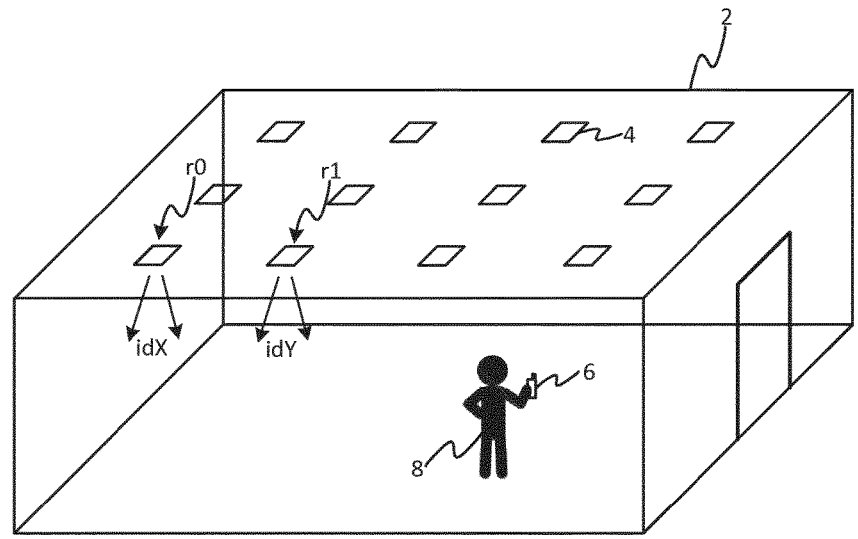
FIG. 1
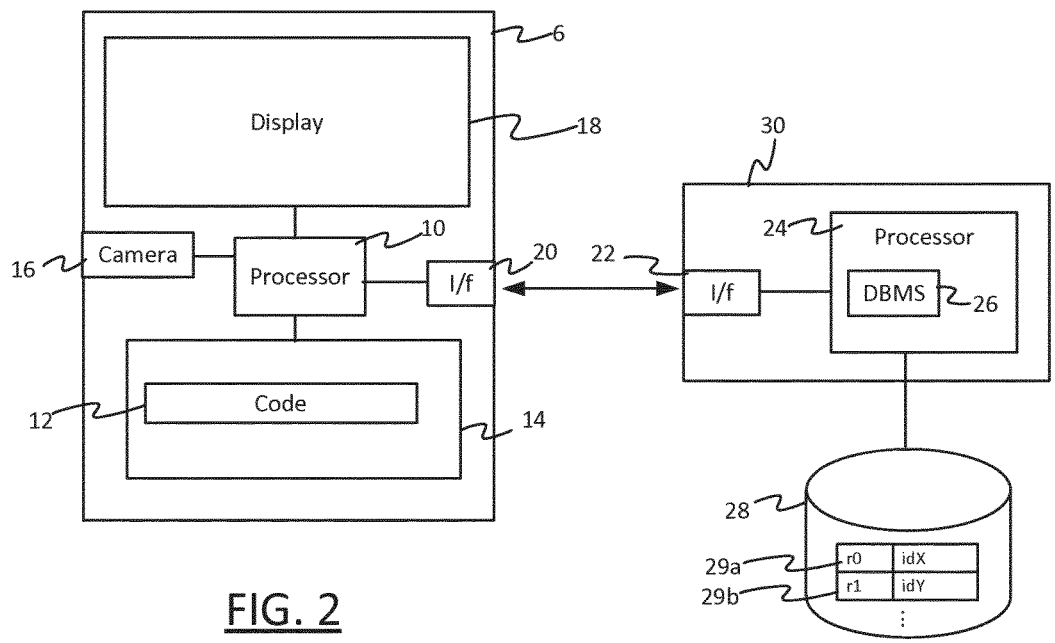
FIG. 2
FIG. 3

MAINTAINING A LIGHTING SYSTEM

CROSS-REFERENCE TO PRIOR APPLICATIONS

This application is the U.S. National Phase application under 35 U.S.C. § 371 of International Application No. PCT/EP2016/067294, filed on Jul. 20, 2016, which claims the benefit of European Patent Application No. 15179712.3, filed on Aug. 4, 2015. These applications are hereby incorporated by reference herein.

TECHNICAL FIELD

The present invention relates to a technique for maintaining a lighting system.

BACKGROUND

Coded light refers to techniques whereby data, such as a Coded Light Identifier (CL ID), is embedded in the light emitted by a light source such as an everyday luminaire. The light typically comprises both a visible illumination contribution for illuminating a target environment such as room (typically the primary purpose of the light), and an embedded signal for providing information into the environment. To do this, the light is modulated at a certain modulation frequency or frequencies, preferably a high enough frequency so as to be beyond human perception and therefore not affecting the primary illumination function. In some cases, a coded light emitter might not have an illumination function at all. In that case, visible light or invisible infra-red light can be used as the medium for transmitting information.

In some of the simplest cases, the signal may comprise a single waveform or even a single tone modulated into the light from a given luminaire. The light emitted by each of a plurality of luminaires may be modulated with a different respective modulation frequency that is unique amongst those luminaires, and the modulation frequency can then serve as an identifier of the luminaire or its light. For example this can be used in a commissioning phase to identify the contribution from each luminaire, or during operation can be used to identify a luminaire in order to control it remotely (e.g. via an RF back channel). In another example, the identification can be used for navigation or other location-based functionality, by mapping the identifier to a known location of a luminaire or information associated with the location.

In other cases, a signal comprising more complex data may be embedded in the light. For example using amplitude keying the amplitude of the light may be varied to encode data, e.g. using high and low levels to represent bits or using a more complex modulation scheme to represent different symbols. Or using frequency keying, a given luminaire is operable to emit on two (or more) different modulation frequencies and to transmit data bits (or more generally symbols) by switching between the different modulation frequencies.

Using Visible Light Communication (VLC) techniques based on coded light, it is possible to provide location awareness, whereby a user device, such as a smart phone or tablet computer, can be located in a building or other environment based on camera images of the luminaires in the ceiling captured by the user device. These luminaires are identified through a CL ID, also referred to herein as a VLC code. With proper configuration, it is possible to determine the location within centimeter accuracy. Location awareness has many applications, and can be used for example to provide information about the item present in a particular location in a shop or museum, or to show the way to a particular item.

The usual way a VLC Indoor Positioning system is configured is with each of the luminaires having a respective unique VLC code that is sent through VLC. These luminaires are installed randomly, and then commissioned in the "commissioning" phase after they have been installed. The commissioning stage involves generating a list in which, for each of the installed luminaires, its respective VLC code is listed in association with an identifier of the location in the building of the luminaire. This list is stored in a database that can then be used, when a code is identified by the mobile device, to retrieve its associated location. Using existing techniques, this is essentially a manual process whereby a technician uses their user device to detect the VLC code emitted by each luminaire at each location, and updates the database to associate that VLC code with that location, one-by-one.

After the database has been populated, some or all of the data may be verified, by a technician going back over the luminaires with their device. For example, US2015/0003836 describes a system in which positions on a map, displayed on a touchscreen, individually correspond to rectangular squares in a grid of lighting fixtures. A control unit can operate in a correction mode. In the correction mode, when identification information is received from a lighting fixture, its recorded location, e.g. grid position (8-G), is displayed on the map. The user can then correct the location, if they can see it is incorrect, by touching the corrected location, e.g. (8-F).

SUMMARY

Existing techniques for populating the database commissioning stage are time consuming and error-prone. They also require the location at which a luminaire is identified to be provided, for each and every luminaire that is installed. This either requires the use of some other positioning technology during commissioning, such as GPS, or it requires the technician to manually indicate the location of each and every identified luminaire, for example on a map. In the case of GPS, this will often be unavailable in certain environments, particularly indoor environments. Indeed of the main advantages of VLC positioning is that it can be provided in environments where e.g. GPS is not available, and a lack of e.g. GPS may even be the reason for installing a VLC positioning system in the first place.

Existing commissioning verification techniques suffer from similar disadvantages. For example, in US2015/0003836 the user is requires to explicitly indicate a new location each and every time a correction is needed. Not only is this time-consuming and onerous for the user, it is in itself another source of error as the user may inadvertently select the wrong new location. For a large system of luminaires in particular (e.g. several hundred, or more), this technique would become highly impracticable and highly error prone as it would be very difficult for the user to accurately pinpoint their position on a map of that many luminaires.

A novel aspect of the present invention is the recognition that it is possible to infer the location at which a luminaire identifier was detected based on when it was detected relative to other detected luminaire identifiers, i.e. based on the temporal ordering of the detection, when it is known or can be assumed that the user is following a particular route through an illuminated environment. This is possible when the locations of the luminaires are known in advance and stored in the database, even if it is not known which luminaires are installed at which of the known locations.

This relieves the technician or the detecting device from the burden of indicating the locations of identified luminaires explicitly, as each luminaire identifier can be automatically associated in the database with its inferred detection location (either during commissioning or to perform largely automated error correction). This in turn removes a potential source of error, and in particular a source of human error in situations where e.g. GPS is unavailable, and is particularly though not exclusively well suited to large, indoor lighting systems.

A first aspect of the present invention is directed to a computer-implemented method of maintaining a lighting system comprising multiple luminaries installed at known locations in an environment, wherein each is configured to emit a unique luminaire identifier into the environment, the method comprising executing management code on a processor to implement the following steps:

accessing a database, wherein the database holds multiple location identifiers, each of which identifies one of the known locations;

identifying a route through the environment based on the location identifiers, the route traversing a plurality of the known locations;

receiving data generated by moving a photodetector (e.g. embodied in a camera) along the route though the environment, wherein the data conveys a sequence of the luminaire identifiers detected by the photodetector from luminaries encountered in moving along the route, the sequence being in order of detection; and performing a database update by, for at least one luminaire identifier in the sequence: identifying its position in the sequence, and updating the database based on the at least one luminaire identifier and its identified position in the sequence.

A particularly advantageous application of the present invention is in one of verifying and/or commissioning a VLC based indoor positioning system.

In various embodiments, the database update may be performed by identifying which of the plurality of known locations on the route the at least one luminaire identifier was detected at based on its identified position in the sequence, and storing it in the database in association with the location identifier of that known location. Example, this may during commissioning in order to initially populate the database, and/or in order to automatically correct detected errors or omissions in a subsequent verification process.

In other embodiments, the at least one luminaire identifier may appear at an unexpected position in the sequence—for example, it will appear too early in the sequence when an expected luminaire identifier is missing in the sequence. The expected luminaire identifier may be missing because, say, the luminaire is malfunctioning or has been re-configured incorrectly. In this case, the database update may be performed in order to account for the missing luminaire identifier, e.g. by removing it from the database or marking it as missing in the database. This may be subject to additional checks to eliminate the possibility of the luminaire identifier being missing due to a detection error.

In embodiments, the method may further comprise controlling a display device (18) to display a visual representation of the route to a user viewing the display device, thereby instructing the user to move the photodetector along the route.

At least some of the location identifiers may already be associated with expected luminaire identifiers held in the database when the data is received. That is, the database may be at least partially pre-populated with expected luminaire identifiers. The pre-opulated database can be used in a number of different ways, including the following.

At least two of the known locations on the route may be associated in the database with at least two of the expected luminaire identifiers respectively, and the steps may further comprise a route detection process of: comparing the sequence of detected luminaire identifiers with the expected luminaire identifiers in the database to detect when the at least two expected luminaire identifiers match at least two detected luminaire identifiers in the sequence, and thereby detecting that the photodetector is moving or has been moved along the route.

Alternatively or in addition, the database update may further comprise: comparing that luminaire identifier to an expected luminaire identifier already associated with that location identifier to detect a mismatch between them, the storing step being performed in response. As an example, the method may further comprise, in response to detecting the mismatch, controlling an output device to output a notification of the mismatch to the user, the storing step being performed only if the user indicates via an input device that they have not deviated from the route.

The input and output devices may constitute a touchscreen.

Alternatively or in addition, the database update may further comprise detecting that that location identifier is not already associated with any luminaire identifier, the storing step being performed in response.

Alternatively or in addition, the method may further comprise determining an expected sequence of luminaire identifiers that is expected along the route, and comparing the expected sequence to the detected sequence to detect when an expected luminaire identifier in the expected sequence is missing from the detected sequence, the database update being performed to account for the missing identifier.

In these or other embodiments, the method may further comprise detecting a speed and/or an acceleration at which the photo detector is moving or has been moved along the detected route, based on:

the relative detection times of the luminaire identifiers in the sequence, the relative detection times being conveyed by the data, and/or accelerometer data generated by moving an accelerometer moved along the route with the photodetector.

The method may further comprise detecting when the detected speed remains below a threshold along the route and/or when the acceleration of the detector remains below a threshold on the route, and the database update may be performed only if at least one of the speed and the acceleration remains below its respective threshold on the route.

The luminaire identifiers may be coded light identifiers (VLC codes) embedded in the illumination emitted by the luminaries.

A second aspect of the present invention is directed to a computer program product comprising management code stored on a computer readable storage medium, the management code configured when executed on a processor to implement any of the method steps disclosed herein.

A third aspect of the present invention is directed to a computer system for maintaining a lighting system comprising multiple luminaries installed at known locations in an environment, wherein each is configured to emit a unique luminaire identifier into the environment, the computer system comprising:

a computer interface configured to connect to a database, wherein the database holds multiple location identifiers, each of which identifies one of the known locations;

computer storage holding executable management code;

a processor connected to the memory, wherein the management code is configured when executed on the processor to implement the following steps:

identifying a route through the environment based on the location identifiers, the route traversing a plurality of the known locations;

receiving data generated by moving a photodetector along the route through the environment, wherein the data conveys a sequence of the luminaire identifiers detected by the photodetector from luminaries encountered in moving along the route, the sequence being in order of detection; and performing a database update by, for at least one luminaire identifier in the sequence: identifying its position in the sequence, and updating the database based on the at least one luminaire identifier and its identified position in the sequence.

In embodiments, the computer system may be configured to implement any of the method steps disclosed herein.

The computer system may, for example, be embodied by a mobile device, the photodetector forming part of the mobile device, and the processor may be connected to receive the data from the photodetector.

As another example, the photodetector may form part of a mobile device, and the computer system is embodied by a computer device other than the mobile device, and the computer device may be configured to receive the data from the mobile device. For example, the environment may be inside a building, and the computer device may form part of a building automation system of the building.

The present disclosure also provides a computer-implemented method of maintaining a lighting system comprising multiple luminaries installed at known locations in an environment, wherein each is configured to emit a unique luminaire identifier into the environment, the method comprising executing management code on a processor to implement the following steps:

accessing a database, wherein the database holds multiple location identifiers, each of which identifies one of the known locations;

identifying a route through the environment based on the location identifiers, the route traversing a plurality of the known locations;

receiving data generated by moving a photodetector along the route though the environment, wherein the data conveys a sequence of the luminaire identifiers detected by the photodetector from luminaries encountered in moving along the route, the sequence being in order of detection; and performing a database update by, for at least one luminaire identifier in the sequence: identifying its position in the sequence, identifying which of the plurality of known locations on the route it was detected at based on its identified position in the sequence, and storing it in the database in association with the location identifier of that known location.

BRIEF DESCRIPTION OF FIGURES

To aid understanding of the present invention, and to show how embodiments of the same may be carried into effect, reference is made by way of example to the following drawings in which:

FIG. 1 shows a schematic illustration of a lighting system;
FIG. 2 shows a block diagram of a user device;
FIG. 3 shows a block diagram of a database server.

DETAILED DESCRIPTION OF EMBODIMENTS

Figure 4A:
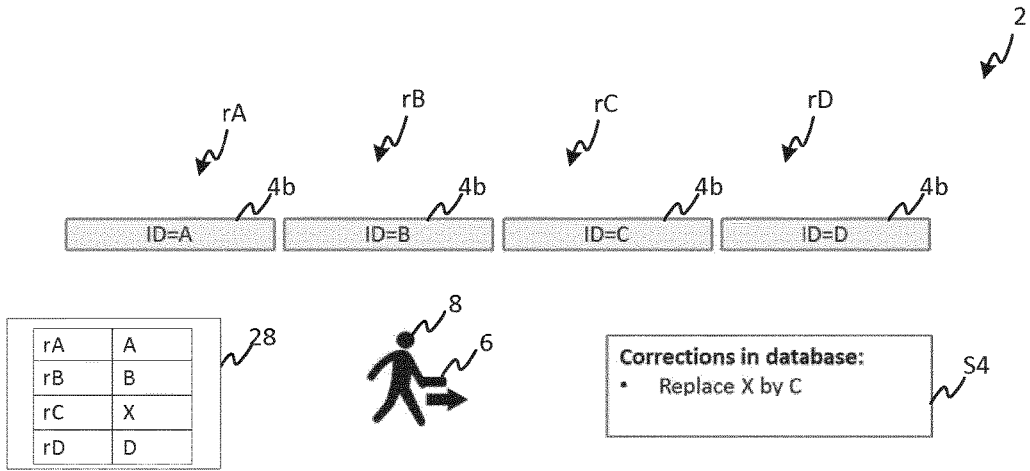
FIG. 4A illustrates a verification process.

FIG. 1 shows an example environment 2, in which embodiments disclosed herein may be deployed. In this example, the environment 2 is an indoor environment.

The present invention has particularly advantageous applications within relatively large indoor environments (though the advantages are by no means limited to these). These include, for example, super/hyper markets, shopping malls, schools, museums, theatres, airports, railway stations, indoor parking lots, leisure parks, hospitals, open plan offices etc.

The environment 2 is installed with a lighting system comprising at least one lighting device 4 in the form a luminaire. Also present in the environment 2 is a user terminal 6, e.g. a mobile device such as a smart phone or tablet, operated by a user 8. Each of the luminaires 4 comprises at least one respective lamp such as an LED-based lamp, gas-discharge lamp or filament bulb, plus any associated housing or support. Each of the luminaires 4 may take any suitable form such as a ceiling or wall mounted luminaire, a free standing luminaire, a wall washer, or a less conventional form such as a luminaire built into a surface or an item of furniture, or any other type of illumination device for emitting illumination into the environment 2 so as to illuminate the environment 2. In the specific examples below, the luminaires 4 are ceiling luminaires, arranged in relatively long, uniform rows, typical of the kinds of environments described above.

Each of the luminaires 4 is configured to emit illumination that embodies a respective luminaire identifier unique to that luminaire, i.e. which distinguishes that luminaire form any other luminaire in the environment 2. Preferably the luminaire identifiers are VLC codes embedded in the visible illumination emitted by that luminaire in a manner that is imperceptible to the user 2. However, the possibility of luminaires 4 emitting luminaire identifiers in other ways so that they are detectable in the environment 4 is not excluded.

FIG. 2 shows a block diagram of the user device 6. The user device comprises a processor 10 connected to a memory 12 which holds executable code 12 for execution on the processor 10. The user device also comprises a camera 16 connected to the processor 10, which includes at least one photodetector i.e. a device capable of sensing radiation (preferably at least visible light) emitted by the luminaires 4. The user device 6 also comprises a computer interface 20, for example network interface based on wired and/or wireless communications technology. The user device 6 also comprises a display device 18, such as a touchscreen, connected to the processor 18, by which information can be outputted to the user 8 in a visual form.

When the user device 6 is in the vicinity of one of the luminaires 6, it can received light emitted by that luminaire via the camera 16. When executed on the processor 10, the code 12 processes the captured image data in order to detect and extract the luminaire identifier embedded in the received illumination. As the user 8 moves through the environment 2, different VLC codes from different ones of the luminaires 4 will be received at different times. Thus, in moving through the environment 2, the user device 6 will detect a temporal sequence of luminaire identifiers (one after the other), ordered by detection time.

The VLC code of each luminaire 4 is generally set at manufacture, though codes may be assigned in other ways. Usually a lighting plan, such as a CAD drawing, with all luminaires is provided to the installer to install the luminaires 4 at a set of known, predetermined locations in the environment 4.

The luminaires 4 are installed randomly in the sense that no consideration is given to which VLC codes are to be emitted at which locations i.e. a given luminaire of a particular type (e.g. a particular model of luminaire) and having a particular VLC code is more or less equally likely to be installed at any one of the known locations earmarked for that type of luminaire. In relatively large environments of the kind described above, often a large number of luminaires of the same type will be installed, making the final distribution of VLC codes within the environment highly unpredictable.

Thus, a typical situation for a newly installed lighting system is that the locations of all of the luminaires 4 are known and already stored in a database, but the spatial distribution of VLC codes across those known locations is not.

FIG. 3 shows a block diagram of a computer in the form of a database server 30 configured to provide access to a luminaire location database 28. The database server 30 comprises a computer interface 22, such as a network interface. The user device 6 and server 30 can transmit and receive data to/from one another via their respective interfaces 20, 22. The database server 30 comprises a processor connected to the interface 22 and to the database 28, which executes database management code 26. The database management code 26 provides an interface to the database 28, by which the user device 6 can retrieve information from the database 28 and store or update information in the database 28.

The database 28 is shows holding a plurality of database records 29a, 29b, each associated with a respective one of the known locations. By way of example, two records are shown in FIG. 3 though in practice the database 28 will hold many more records—one for each luminaire location (e.g. several hundred, or more). Each record 29a, 29b comprises a location identifier r0, r1 of its associated location, and the VLC code idX, idY emitted by the luminaire 4 installed at that location, as illustrated in FIG. 1. Thus, each location identifier r0, r1 is associated in the database 28 with the VLC code idX, idY of the luminaire 4 installed at that location.

The locations identifiers r0, r1 can take different forms, for example:

Latitude, Longitude
Latitude, Longitude, altitude
Latitude, Longitude, floor

These examples are not exhaustive; locations can be identified in many different ways, for example based on a grid reference system in the case of a uniform distribution of luminaires.

With the database 28 populated in this manner, a VLC based indoor positioning service can be provided within the environment 2. The basic premise of the positioning service is that, when a user device 6 present in the environment detects a VLC code, it can look up the location associated with it in the database 6. More sophisticated techniques exist which build on this basic premise, which as indicated above can provide a location service with cm accuracy.

However, before this service can be provided, the database 28 must be populated with the VLC codes idX, idY. In order to populate the database 28 with this information, after installation of the lighting system, a subsequent commissioning phase is performed. Prior to commissioning, the database is populated with the known location identifier r0, r1 (but not the VLC codes idX, idY). The commissioning phase then involves inputting the VLC codes into the database 28, and mapping them to the appropriate ones of the location identifiers r0, r1 already stored in the database 28.

The typical number of luminaires 4 in a building (e.g. a shop) is of the order of 300-10,000. As indicated, existing commissioning techniques are time consuming and error-prone, particularly when applied to such large lighting systems.

In addition, luminaires might fail during the many years that a lighting installation is used, so these will be replaced. The new luminaire will have a different VLC code, hence creating an error in the database 28.

As explained in more detail below, certain embodiments of the present invention provide fast and efficient verification. In particular, these embodiments provide mechanisms by which errors in the database 28 can be detected with minimal effort, and corrected largely automatically. This includes errors that arose in the commissioning stage, i.e. where a technician wrongly inputted data into the database, or errors arising later due to changes in the lighting system, e.g. caused by a luminaire that was recorded correctly during commissioning being replaced with a new luminaire with a different identifier. This verification can be based on data collected by a technician during a designated verification process, or based on data collected from multiple users over time when the system is in use. Other embodiments enable efficient commissioning, that is faster than conventional commissioning techniques.

As noted above, existing commissioning techniques suffer from a disadvantage, in that every time a VLC code is detected during the commissioning, the location at which it was detected must explicitly indicated each and every time. This either requires the detecting device to include a positioning mechanism, such as GPS (often not feasible indoors), or it requires the technician to explicitly indicate their location manually each time, for example on a map. Existing verification techniques from similar disadvantage, in that when a correction is made to the database to change the location wrongly associated with a particular identifier, the new location must be also be indicated explicitly (e.g. on a map, as in US2015/0003836).

By contrast, as indicated above, the present invention recognizes that—in the case that the locations of the luminaires 4 are known and pre-stored in the database 28 (e.g. inputted based on the lighting plan)—the location at which a luminaire identifier has been detected can be inferred based on when that luminaire identifier was detected relative to other detected luminaire identifiers, when it is known or can be assumed that the user is following a particular route through the environment 2. That is, based on its position in the sequence of luminaire identifiers detected in moving along the route.

To put it another way, where a route through the environment 2 traverses N of the known locations in turn, a user moving along that route will detect N luminaire identifiers in turn. Thus, when the system knows that the user is following that route or can reasonably assume that they are, e.g. because it has instructed them to, it also knows that the nth luminaire identifier to be detected along the route (i.e. at the nth position in the sequence) was detected at the nth location on the route, and can therefore update the database 29 as appropriate without this location having to be indicated explicitly (0≤n≤N).

Verifying Commissioning

Preferred embodiments of the present invention apply this technique to the verification and correction of the database 28.

A computer program checks the luminaire location database 28 and corrects errors automatically. This computer program uses the commissioning database 28 as an input and runs on a device that can receive the VLC codes from the luminaires. The program can be either implemented in the mobile device 6 that receives the CL IDs (i.e. by the code 12) or in the database server 30 (i.e. by the database management code 26), or its functionality can be distributed across the two devices 6, 30 in a number of different ways.

In some embodiments, the database server 30 is local in the sense that it is part of the lighting system infrastructure itself (e.g. being located in the same building, and forming part of a building automation system). In this case, the database itself 28 may also be local in the same sense, or it may be remote from the lighting system and accessed via a network such as the Internet. In other embodiments, the database server 30 is remote from the lighting system, and is accessed via e.g. the Internet. For example, the database server 30 may be a cloud-based server.

In some cases, the functionality of the database server 30 may instead be distributed across multiple servers. For example, its functionality may be distributed across a local server device and a remote (e.g. cloud-based) server device, e.g. with the local server device performing the bulk of the required processing to automatically detect and update errors, and the remote server providing a generic interface to the database 28 for use by the local server.

In other embodiments, some or all of the required processing may be performed by the mobile device 6 itself. As an example, such a mobile device 6 may interface directly with a cloud database 28 via the Internet. Alternatively, the mobile device 6 may perform minimal processing e.g. so that it only functions as a detector and UI provider for indicating the route; in this case, the bulk of the processing could be performed by a computer of the building automation system, or remotely e.g. on a cloud server.

In general, a computer system implementing the present subject matter may be localized, i.e. embodied in a single device such as the mobile device 6 or a computer device separate from the mobile device 6 (e.g. a local or remote server), or it may be distributed across a plurality of interconnected computer devices (which may or may not include the mobile device 6).

A first example is described, by which the user 8, who is a commissioning engineer in this example, can verify commissioning and correct commissioning errors. It is assumed that a large number of equal luminaires are installed in rows, with the luminaires in each row installed at substantially equal distances relative to one another. This represent a typical situation in the kinds of environments described above.

Because the computer program knows the location of all luminaires 4 from the location identifiers pre-stored in the database 28, it can control the display 18 to display a visual representation (e.g. a map) on which the luminaires 4 are visible to the user 8.

The user 8 walks slowly and as much as possible with constant speed through the environment 2 with the camera 16 of the device 6 facing towards the luminaires 4, following the lines of luminaires 4 (e.g. trunks, rows of down lights, etc.). Constant speed means an acceleration remaining sufficiently close to zero.

For example, the computer program may determine whether the speed and/or the acceleration each remain below a respective threshold on the route, and the process may be halted if either or each exceeds its respective threshold. Detecting the codes takes some time, which imposes a maximum speed. Because the locations of the luminaires are known, it is not essential that the speed is constant. However, in this case, a constant speed can be a secondary indicator that the procedure is being properly performed.

Provided the luminaires 4 have been commissioned is at least approximately correctly, the computer program can perform a route detection process to infer information about where the user is walking, based on the VLCs detected from the luminaires 4. The computer program can do this as it can verify that the sequence of VLC codes being detected by the user 8 at least approximately matches an expected sequence of VLC codes expected to be detected in moving along one of the rows of luminaires 4. To put it another way, the inventors have recognized that a perfect match is not required to detect which row the user 8 is walking along—so even if the database 28 contains some errors, it is still possible to identify which row the user 8 is walking along, which in turn allows errors in that row to be detected and corrected.

A novel aspect of this embodiment is the notion of detecting which route a user is walking on based on an imperfect database 28 (i.e. containing errors), and then using the knowledge gleaned from this detection to perfect the database (i.e. correct those errors).

For those parts of the route along which the commissioning of the luminaires 4 is correct, the computer program can verify that the user is walking slowly and at constant speed. Speed is determined based on when the VLC codes are detected by the camera 16 of relative to one another. As another example, the walking speed may be determined using an accelerometer of the mobile device 6—for example, suitable techniques that could be implemented are set out in "Inertial Sensor-Based Methods in Walking Speed Estimation: A Systematic Review"; Yang, Li (2012).

If a luminaire 4 is wrongly commissioned, the computer program will notice a 'location-jump'. A location-jump occurs when the nth detected luminaire identifier does not match the expected luminaire currently associated with the nth location along the chosen route in the database, as inputted during commissioning.

In response to detecting a location jump for the nth detected VLC ID, the computer program notifies the user 8 by making the jump visible on the display 18. The user 8 can acknowledge that the apparent jump does not reflect the real path they are taking, i.e. that a commissioning error is indeed present. This can be as straightforward as presenting a selectable yes/no option(s) on the touchscreen display 18, which the user can select accordingly—the user is not required to work out what their current location is, nor are positioning techniques such as GPS required. The user simply verifies that they did not deviated from the route, by way of a suitable input at the user device 6 that is received by the computer program.

If the user 8 indicates that they have not deviated from the route, then the computer program knows that the location-jump has been caused by an error in the database 28. Thus, in response to the user input, it replaces the expected luminaire identifier in the database with the luminaire detected at the nth location in moving along the route.

In a preferred embodiment, the computer program instructs the commissioning engineer which row of luminaires to follow, by outputting a visual representation of the route beforehand, for example by shown the route on the displayed map. To this end, the computer program identifies the route based on the location identifiers in the database, e.g. based on one or more geographic proximity criteria. For example, it may identify a route in a particular direction (e.g. y direction) by identifying all the locations that are within a certain distance from one another in a perpendicular direction (e.g. x-direction).

In such embodiments, the computer program thus has foreknowledge of which route the user 8 should be following, and can use the route detection process described above to verify that the user 8 is indeed following that route as instructed.

Alternatively, the route may not instruct the user to follow a particular route, and may instead use the route detection process described above to determine which route the user 8 is following without such foreknowledge. For example, the computer program may identify all possible straight-line routs though the environment based on the location identifiers in the database. Then, when the user moves along one of these, it can identify which one the user is moving along by comparing the sequence of luminaire identifiers received by the user to the sequence of luminaire identifiers expected along each straight-line route in the environment to determine which sequence of expected identifiers best matches the detected sequence (as noted, the match does not have to be perfect in order to identify the route).

A simple example is visualized in FIG. 4A. In this example, some mistakes were made during commissioning, which in an installation with so many luminaires is more or less inevitable.

A row of ceiling luminaires 4a, . . . , 4d is shown, as locations rA, rB, rC and rD respectively, and having VLC codes A, B, C and D respectively which they emit into the environment 2 embedded in their respective illumination.

The luminaires 4 may for example be trunk luminaires, down light luminaires etc. Only four luminaires are shown, but in practice a row may contain many more luminaires.

The database 23 contains an error, as the luminaire identifier associated with location rC in the database 28 is X not C. The commissioning engineer 8 walks along the line of luminaires with the camera 16 of their user device 6 pointing up towards the ceiling. As the user walks along, they detect the sequence of VLC codes (A, B, C, D) in turn.

In some embodiments, the computer program detects that the user is moving along the route (rA, rB, rC, rD) by comparing at least part of the sequence of detected identifiers (A, B, C, D) to the expected sequence of luminaire identifiers (A, B, X, D). In this case, it is clear the user is moving along the route as (rA, rB, rC, rD) three out of four identifiers match.

Because the computer program knows the user is following the route (rA, rB, rC, rD), it knows that the third, non-matching VLC code (C) to be detected in moving along the route must have been detected at the third location along the route (rC), and corrects the database accordingly (S4) to replace X with C in the record associated with location rC. Preferably this correction is subject to the user 8 verifying that they have not deviated from a straight-line path.

In some embodiments, after making a correction, the computer program instructs the technician 8 to e.g. partially re-trace the path, or instructs them to follow a new path (which includes the location that has been corrected) to verify the correction. That is, in embodiments, the computes program provides a route to an engineer to follow, verifies the IDs encountered on the route and/or corrects identifiers on the route, and automatically instructs the technician to re-trace at least part of the route to verify the problem is solved.

A further preferred embodiment can identify commissioning errors from the apparent movement of ordinary users i.e. when the VLC positioning system in in use. If in, say, a shop most of the users make a strange and sudden move according to the VLC Indoor Positioning system, the system can automatically generate a warning that there is likely to be a non-correct luminaire location in the database.

Another type of fault that can be detected using the present techniques is when a VLC code is missing: e.g. when a sequence of VLC IDs (ID1, ID2, ID3, ID4) is expected, but the sequence (ID1, ID3, ID4) is in fact detected, the computer program detects that "ID2" is missing from the detected sequence. This can occur, for example, when a lamp is malfunctioning; when a VLC lamp has been replaced with a non-VLC lamp, or due to a detection error (e.g. if the camera is accidentally obscured for a short time).

A notification of the missing ID is displayed to the user in response to detecting that an ID is missing. In order to determine whether the missing ID has simply arrived due to a detection error, the user may be prompted to re-trace at least part of the route or a different route which is expected to include the missing ID. If "ID2" is still missing ID, the user may for example be prompted to replace or adjust the relevant lamp(s). The database may also be updated to record the error i.e. to indicate that the relevant luminaire is not currently emitting a detectable luminaire identifier—for example, by removing "ID2" from the appropriate database record.

In a preferred embodiment the system notifies if a certain luminaire is 'missed' by many users over and over again. In this case apparently something is wrong with this luminaire.

Fast Commissioning

Figure 4B:
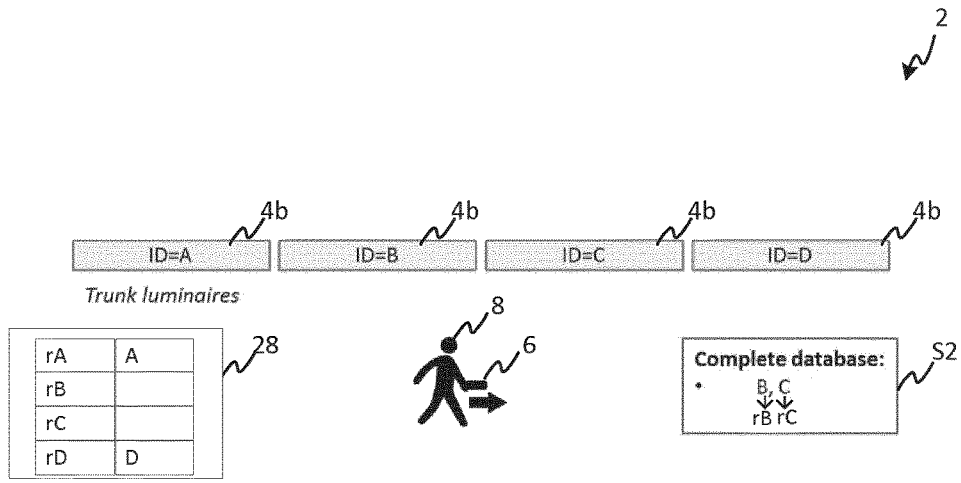
FIG. 4B illustrates a commissioning process.

The computer program can also be used to reduce the time it takes to perform commissioning of rows of luminaires, as illustrated in FIG. 4B. The commissioning engineer 8 can commission (e.g.) the first and last luminaires 4a, 4d in a row, and then walk along the line of luminaires 4a, 4b, 4c, 4d and the program completes the database (S2). The program is able to identify the route the commissioning engineer has taken from the two commissioned luminaires 4a, 4d alone, as this in effect provided the two points needed to fully define a straight line. The computer program stores the detected sequence of luminaire IDs (A, B, C, D) as the user 8 moves along the route. Once the have completed the route, the route is identified from the IDs A and D, and the remaining locations are populated with the remaining IDS (B,C).

Adapting to Changes:

Changes in a lighting system can occur e.g. years after installation and commissioning.

After a lighting installation is installed and commissioned, by way of example, any of the following is subject to change:

A luminaire fails and is replaced;

A LED driver fails and is replaced;

Two or more luminaires are removed and reinstalled at exchanged locations;

A spot is moved along a track, added to a track or removed.

Re-performing commissioning after each and every such an event would be time consuming, disruptive and potentially expensive, not least because experts with special equipment are required on site.

Embodiments of the present invention take advantage of the fact that in most cases there are only a few changes in an installation with many luminaires that are still correctly commissioned. Thus it is still possible to detect what route a user is following, based on imperfect matches between detected and stored identifiers.

From the VLC codes that are received by multiple user devices 6 in the environment—operated by end-users, i.e. consumers of the VLC position service, rather than specialist technicians—the changes can be detected and corrected, in a similar way to that shown in FIG. 4A.

A difference with verifying commissioning is that it is unknown how end-users walk through the store i.e. end-user cannot be expected to slowly in straight lines and at constant speed. A sequence of VLC codes that is sent to the database 28 may initially appear inconsistent with the database 28, but this can be caused by an end user walking in an awkward way through the store, e.g. running fast, developing an unusual speed by means of some vehicle or by covering the camera of his device. As another example, racks or product might have been removed, hence enabling walking paths that were impossible before (and hence never occurred).

Correcting the database is still possible if certain VLC code sequences are repeatedly detected, that are inconsistent with what was found in the past, but consistent from a certain point in time. Positioning is coupled to the location of the luminaires, not to the location of (e.g.) the racks or other obstacles placed on the floor. When the luminaire locations remain unchanged, but one or more of the luminaires themselves are changed (e.g. different code, no code or failing luminaire), this can be automatically detected from the paths of users (preferably many users to average out speed differences).

In a preferred embodiment, the computer program seeks confirmation from a person (e.g. technician or manager) on site before the database is adapted according to user information. For example the person on site can confirm that a luminaire was repaired recently.

In another preferred embodiment, the system keeps track of walking paths, hence enabling more reliable detection of luminaire (or driver) replacements. The Indoor Positioning system follows someone's path as long as he/she uses the app and has the luminaires in sight of the camera.

In some embodiments, a review of the store database 28 that has just been commissioned is performed to filter out "outliers" that are not within the geographic area of the store.

Even when a CL-ID is found that is not part of the database yet, this CL-ID can be added to the database 28 at the respective location when above consistent order is found after a certain point in time.

In various embodiments, the present invention may be implemented in real-time, whereby the database is corrected and/or updates as the user(s) moves though the environment, or it may be implemented off-line, by collecting the relevant data and making corrections/updates at a later time. The two approaches can be combined to provide a combination of real-time and off-line processing.

In the above described embodiments, a sequence of VLC codes is conveyed by sensor data from the camera. The sequence is ordered by detection time, though the detection time is not (and need not be) identified explicitly—the order of detection is simply conveyed by the order in which the codes are received from the camera 16 in turn. In other embodiments, time stamps may be used to convey the ordering of the sequence, or any other suitable metadata (e.g. sequence indexes) and/or data structure may be used to convey the ordering of the sequence.

The term "data generated by moving a photodetector along the route" in the following includes, for instance: raw or minimally processed sensor data captured by the photodetector (e.g. camera images) from which the sequence of luminaire identifiers can be extracted; or the sequence of identifiers itself, which has already extracted from such raw data (for example, where the bulk of the processing is performed by the server 30, the mobile device 6 may nonetheless extract the IDs from raw image data, and communicate the extracted sequence to the server 30) etc.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method of maintaining a lighting system comprising multiple luminaries installed at known locations in an environment, wherein each is configured to emit a unique luminaire identifier into the environment, the method comprising executing management code to implement the following steps:

in a processor:
  accessing a database, wherein the database holds multiple location identifiers, each of which identifies one of the known locations;
  identifying a route through the environment based on the location identifiers, the route traversing a plurality of the known locations;
  moving a photodetector along the route through the environment;
in the processor:
  receiving data generated by the photodetector wherein the data conveys a sequence of the luminaire identifiers detected by the photodetector from luminaries encountered in moving along the route, the sequence being in order of detection; and
  performing a database update by, for at least one luminaire identifier in the sequence: identifying its position in the sequence, and updating the database based on the at least one luminaire identifier and its identified position in the sequence.

2. The method of claim 1, wherein the database update is performed by identifying which of the plurality of known locations on the route the at least one luminaire identifier was detected at based on its identified position in the sequence, and storing it in the database in association with the location identifier of that known location.

3. The method of claim 1, further comprising controlling a display device to display a visual representation of the route to a user viewing the display device, thereby instructing the user to move the photodetector along the route.

4. The method of claim 1, wherein at least some of the location identifiers are already associated with expected luminaire identifiers held in the database when the data is received.

5. The method of claim 4, wherein at least two of the known locations on the route are associated in the database with at least two of the expected luminaire identifiers respectively, wherein the steps further comprise a route detection process of:
    comparing the sequence of detected luminaire identifiers with the expected luminaire identifiers in the database to detect when the at least two expected luminaire identifiers match at least two detected luminaire identifiers in the sequence, and thereby detecting that the photodetector is moving or has been moved along the route.

6. The method of claim 4, wherein the database update further comprises: comparing that luminaire identifier to an expected luminaire identifier already associated with that location identifier to detect a mismatch between them, the storing step being performed in response.

7. The method of claim 6, further comprising in response to detecting the mismatch, controlling an output device to output a notification of the mismatch to the user, the storing step being performed only if the user indicates via an input device that they have not deviated from the route.

8. The method of claim 4, wherein the database update further comprises detecting that one of the location identifiers is not already associated with any luminaire identifier, the storing step being performed in response.

9. The method of claim 4, wherein the method further comprises determining an expected sequence of luminaire identifiers that is expected along the route, and comparing the expected sequence to the detected sequence to detect when an expected luminaire identifier in the expected sequence is missing from the detected sequence, the database update being performed to account for the missing identifier.

10. The method of claim 1, further comprising detecting a speed and/or an acceleration at which the photo detector is moving or has been moved along the detected route, based on:
    the relative detection times of the luminaire identifiers in the sequence, the relative detection times being conveyed by the data, and/or
    accelerometer data generated by moving an accelerometer moved along the route with the photodetector.

11. A computer program product comprising management code stored on a computer readable storage medium, the management code configured when executed on a computer to implement the method steps of claim 1.

12. A computer system for maintaining a lighting system comprising multiple luminaries installed at known locations in an environment, wherein each is configured to emit a unique luminaire identifier into the environment, the computer system comprising:
    a computer interface configured to connect to a database, wherein the database holds multiple location identifiers, each of which identifies one of the known locations;
    computer storage holding executable management code;
    a processor connected to a memory, wherein the management code is configured when executed on the processor to implement the following steps:
    identifying a route through the environment based on the location identifiers, the route traversing a plurality of the known locations;
    receiving data generated by moving a photodetector along the route through the environment, wherein the data conveys a sequence of the luminaire identifiers detected by the photodetector from luminaries encountered in moving along the route, the sequence being in order of detection; and
    performing a database update by, for at least one luminaire identifier in the sequence: identifying its position in the sequence, and updating the database based on the at least one luminaire identifier and its identified position in the sequence.

13. The computer system of claim 12, which is embodied by a mobile device, the photodetector forming part of the mobile device, wherein the processor is connected to receive the data from the photodetector.

14. The computer system of claim 12, wherein the photodetector forms part of a mobile device, and the computer system is embodied by a computer device other than the mobile device, wherein the computer device is configured to receive the data from the mobile device.

15. The computer system of claim 14, wherein the environment is inside a building, and the computer device forms part of a building automation system of the building.

* * * * *